(12) United States Patent
Hille

(10) Patent No.: US 11,065,933 B2
(45) Date of Patent: Jul. 20, 2021

(54) METHOD AND APPARATUS FOR PROVIDING LOCATION-AWARE WHEEL CAMBER SETTINGS

(71) Applicant: HERE GLOBAL B.V., Eindhoven (NL)

(72) Inventor: Marlon Hille, Steinbach (DE)

(73) Assignee: HERE Global B.V, Eindhoven (NL)

(*) Notice: Subject to any disclaimer, the term of this patent is extended or adjusted under 35 U.S.C. 154(b) by 285 days.

(21) Appl. No.: 16/368,356

(22) Filed: Mar. 28, 2019

(65) Prior Publication Data

US 2020/0307344 A1 Oct. 1, 2020

(51) Int. Cl.

| | |
|---|---|
| *B60G 21/00* | (2006.01) |
| *G06F 7/00* | (2006.01) |
| *B62D 17/00* | (2006.01) |
| *G01C 9/00* | (2006.01) |
| *G06N 5/04* | (2006.01) |
| *G01M 17/00* | (2006.01) |

(Continued)

(52) U.S. Cl.
CPC ..... *B60G 21/007* (2013.01); *B60G 17/01908* (2013.01); *B60G 2400/73* (2013.01); *B60G 2400/824* (2013.01)

(58) Field of Classification Search
CPC ......... B60G 21/00; B60G 17/015; G06F 7/00; G06F 16/953; B62D 17/00; G01C 9/00; G06N 5/04; G01M 17/00; B60C 23/00; G07C 5/00
See application file for complete search history.

(56) References Cited

U.S. PATENT DOCUMENTS 7,043,396 B2 * 5/2006 Larson .................. G01B 21/26
33/203.14
9,571,449 B2 * 2/2017 Obradovich ............ H04L 43/08
(Continued)

FOREIGN PATENT DOCUMENTS

| JP | 2011131848 A | 7/2011 |
|---|---|---|
| WO | 2017048762 A1 | 3/2017 |

OTHER PUBLICATIONS

Stroud, "Enhancing Vehicle Dynamics Through Real-time Tyre Temperature Analysis", retrieved on Feb. 8, 2019 from https://core.ac.uk/download/pdf/145041250.pdf, 142 pages.

(Continued)

*Primary Examiner* — Yuri Kan
(74) *Attorney, Agent, or Firm* — Ditthavong, Steiner & Mlotkowski

(57) ABSTRACT

An approach is provided for location-aware wheel camber settings. The approach involves, for example, collecting tire temperature data, wheel camber data, and location data from one or more sensors of a plurality of vehicles. The approach also involves processing the tire temperature data, wheel camber data, and location data to determine a target wheel camber for a road segment indicated by the location data. The target wheel camber is determined from one or more observed wheel cambers indicated in the wheel camber data. The target wheel camber is also associated with a target tire temperature indicated in the tire temperature data. The approach further involves storing the target wheel camber as an attribute of map data associated with the road segment.

20 Claims, 13 Drawing Sheets

(51) Int. Cl.
  *B60C 23/00* (2006.01)
  *G07C 5/00* (2006.01)
  *B60G 17/015* (2006.01)
  *G06F 16/953* (2019.01)
  *B60G 17/019* (2006.01)

(56) References Cited

U.S. PATENT DOCUMENTS

| | | | |
|---|---|---|---|
| 9,767,692 B1* | 9/2017 | Vaudreuil | H04N 7/188 |
| 2015/0005982 A1* | 1/2015 | Muthukumar | G01P 15/00 |
| | | | 701/1 |
| 2017/0372532 A1* | 12/2017 | Merg | G06Q 10/20 |
| 2018/0121818 A1* | 5/2018 | Smith | G06N 3/04 |
| 2018/0201319 A1* | 7/2018 | Rogers | B62D 17/00 |
| 2018/0251156 A1* | 9/2018 | Sigmar | B60G 15/02 |
| 2018/0319235 A1* | 11/2018 | Wittenschlaeger | B60G 17/06 |
| 2020/0250246 A1* | 8/2020 | Meyer | G06F 16/953 |

OTHER PUBLICATIONS

Butcher, "Tires & Temperature", retrieved on Feb. 8, 2019 from https://www.joesracing.com/rt-4219-tires-temperature.html, pp. 1-9.

\* cited by examiner

US 11,065,933 B2

METHOD AND APPARATUS FOR PROVIDING LOCATION-AWARE WHEEL CAMBER SETTINGS

BACKGROUND

Vehicle manufacturers are constantly including new technology to extract higher performance from their vehicles and particularly from their sport vehicle models. In earlier generations, sports cars had to be designed with mechanical configurations that could perform in multiple scenarios, as these were not easily adjustable. The latest generations of such vehicles can now execute adjustments to their configurations on the move (e.g., wheel camber adjustments), responsive to the current driving conditions to achieve higher performance. Ultimate car performance typically requires compromises to be made. However, many of these compromises sacrifice driver comfort, tire wear, fuel consumption, component wear, and the like.

SOME EXAMPLE EMBODIMENTS

As a result, there is a need for an approach for providing location-aware wheel camber settings to provide dynamic wheel camber adjustments to avoid or reduce the effects of compromises made to achieve higher vehicle performance.

According to one embodiment, a method for providing location-aware wheel camber settings comprises collecting tire temperature data, wheel camber data, and location data from one or more sensors of a plurality of vehicles. The method also comprises processing the tire temperature data, wheel camber data, and location data to determine a target wheel camber for a road segment indicated by the location data. The target wheel camber is determined from one or more observed wheel cambers indicated in the wheel camber data and is also associated with a target tire temperature indicated in the tire temperature data. The method further comprises storing the target wheel camber as an attribute of map data associated with the road segment. By way of example, the map data can be provided with the stored target wheel camber to requesting vehicle that is traveling or is predicted to travel the road segment. The stored target wheel camber can then be used to adjust a wheel camber setting of the requesting vehicle.

According to another embodiment, an apparatus for providing location-aware wheel camber settings comprises at least one processor, and at least one memory including computer program code for one or more computer programs, the at least one memory and the computer program code configured to, with the at least one processor, cause, at least in part, the apparatus to collect tire temperature data, wheel camber data, and location data from one or more sensors of a plurality of vehicles. The apparatus is also caused to process the tire temperature data, wheel camber data, and location data to determine a target wheel camber for a road segment indicated by the location data. The target wheel camber is determined from one or more observed wheel cambers indicated in the wheel camber data and is also associated with a target tire temperature indicated in the tire temperature data. The apparatus is further caused to store the target wheel camber as an attribute of map data associated with the road segment. By way of example, the map data can be provided with the stored target wheel camber to requesting vehicle that is traveling or is predicted to travel the road segment. The stored target wheel camber can then be used to adjust a wheel camber setting of the requesting vehicle.

According to another embodiment, a non-transitory computer-readable storage medium for providing location-aware wheel camber settings carries one or more sequences of one or more instructions which, when executed by one or more processors, cause, at least in part, an apparatus to collect tire temperature data, wheel camber data, and location data from one or more sensors of a plurality of vehicles. The apparatus is also caused to process the tire temperature data, wheel camber data, and location data to determine a target wheel camber for a road segment indicated by the location data. The target wheel camber is determined from one or more observed wheel cambers indicated in the wheel camber data and is also associated with a target tire temperature indicated in the tire temperature data. The apparatus is further caused to store the target wheel camber as an attribute of map data associated with the road segment. By way of example, the map data can be provided with the stored target wheel camber to requesting vehicle that is traveling or is predicted to travel the road segment. The stored target wheel camber can then be used to adjust a wheel camber setting of the requesting vehicle.

According to another embodiment, an apparatus for providing location-aware camber settings comprises means for collecting tire temperature data, wheel camber data, and location data from one or more sensors of a plurality of vehicles. The apparatus also comprises means for processing the tire temperature data, wheel camber data, and location data to determine a target wheel camber for a road segment indicated by the location data. The target wheel camber is determined from one or more observed wheel cambers indicated in the wheel camber data and is also associated with a target tire temperature indicated in the tire temperature data. The apparatus further comprises means for storing the target wheel camber as an attribute of map data associated with the road segment. By way of example, the map data can be provided with the stored target wheel camber to requesting vehicle that is traveling or is predicted to travel the road segment. The stored target wheel camber can then be used to adjust a wheel camber setting of the requesting vehicle.

According to one embodiment, a method for providing location-aware wheel camber settings comprises detecting a location of a vehicle that is traveling or is predicted to travel a road segment. The method also comprises performing a query for map data for the road segment based on the location of the vehicle. The map data is generated to indicate a target wheel camber for the vehicle, and the target wheel camber is determined from one or more observed wheel cambers that is associated with a target tire temperature for the road segment. The method further comprises initiating an adjustment of a wheel camber setting of the vehicle based on the target wheel camber to travel the road segment.

According to another embodiment, an apparatus for providing location-aware wheel camber settings comprises at least one processor, and at least one memory including computer program code for one or more computer programs, the at least one memory and the computer program code configured to, with the at least one processor, cause, at least in part, the apparatus to detect a location of a vehicle that is traveling or is predicted to travel a road segment. The apparatus is also caused to perform a query for map data for the road segment based on the location of the vehicle. The map data is generated to indicate a target wheel camber for the vehicle, and the target wheel camber is determined from one or more observed wheel cambers that is associated with a target tire temperature for the road segment. The apparatus is further caused to initiate an adjustment of a wheel camber setting of the vehicle based on the target wheel camber to travel the road segment.

According to another embodiment, a non-transitory computer-readable storage medium for providing location-aware wheel camber settings carries one or more sequences of one or more instructions which, when executed by one or more processors, cause, at least in part, an apparatus to detect a location of a vehicle that is traveling or is predicted to travel a road segment. The apparatus is also caused to perform a query for map data for the road segment based on the location of the vehicle. The map data is generated to indicate a target wheel camber for the vehicle, and the target wheel camber is determined from one or more observed wheel cambers that is associated with a target tire temperature for the road segment. The apparatus is further caused to initiate an adjustment of a wheel camber setting of the vehicle based on the target wheel camber to travel the road segment.

According to another embodiment, an apparatus for providing location-aware camber settings comprises means for detecting a location of a vehicle that is traveling or is predicted to travel a road segment. The apparatus also comprises means for performing a query for map data for the road segment based on the location of the vehicle. The map data is generated to indicate a target wheel camber for the vehicle, and the target wheel camber is determined from one or more observed wheel cambers that is associated with a target tire temperature for the road segment. The apparatus further comprises means for initiating an adjustment of a wheel camber setting of the vehicle based on the target wheel camber to travel the road segment.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing location-aware camber settings are disclosed.

In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
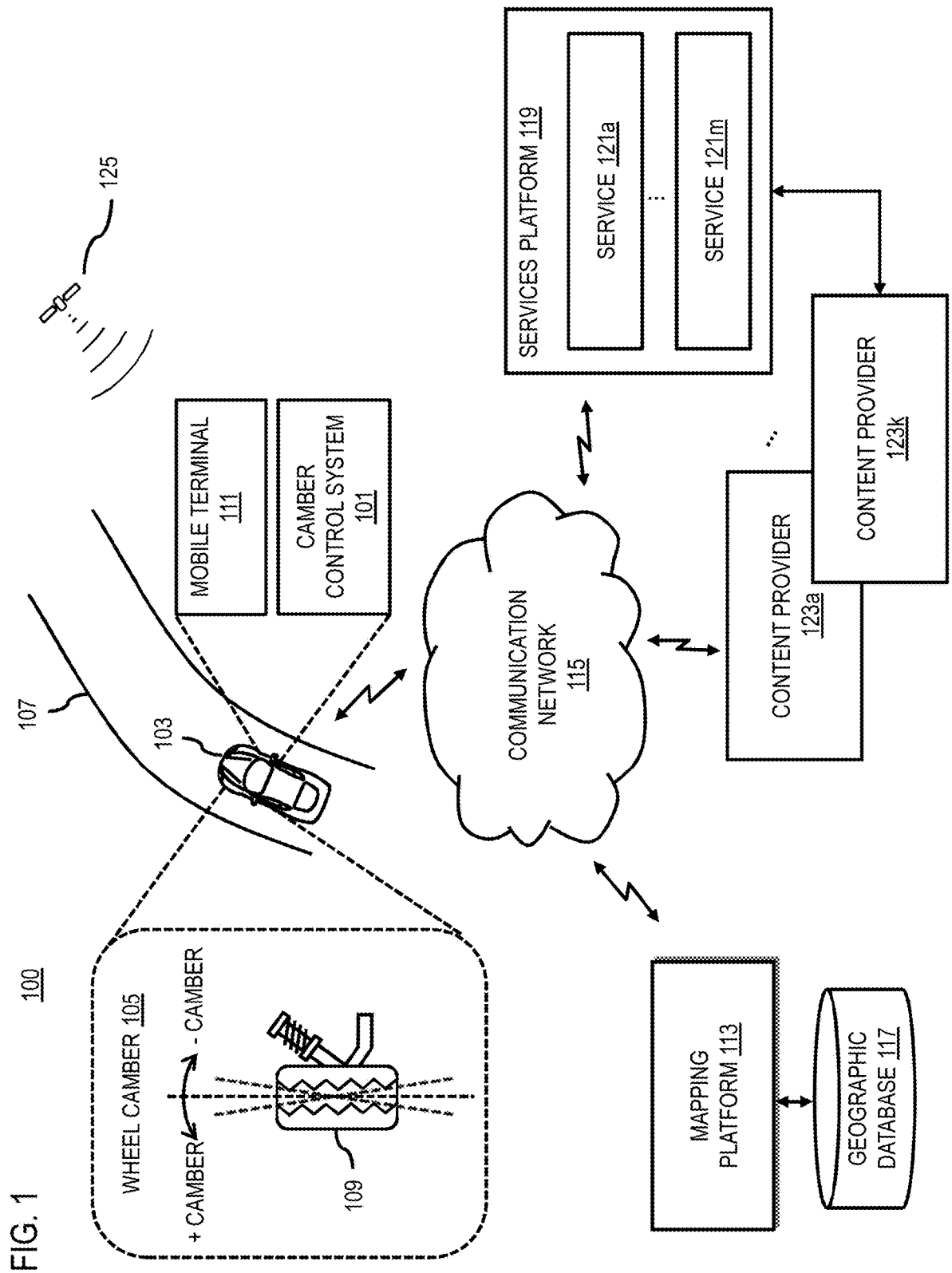
FIG. 1 is a diagram of a system capable of providing location-aware camber settings, according to one embodiment.

FIG. 1 is a diagram of a system capable of providing location-aware camber settings, according to one embodiment. As noted above, vehicle manufacturers are constantly developing new technologies to improve the performance of their vehicles. One area of development has been in the area of active or dynamic configuration of suspension components to provide for greater adjustability. In particular, vehicle manufacturers have developed systems (e.g., a camber control system 101 of a vehicle 103) that can provide for adjusting wheel camber 105 on demand and/or on the fly as the vehicle travels along a road segment 107. Wheel camber 105 refers, for instance, to the angle made by a wheel 109 with respect to a vertical line orthogonal to a road surface when the viewed from the front or rear. An angling of the top of the wheel 109 towards the vehicle 103 is considered to be negative camber and an angling of the top of the wheel 109 away from the vehicle 103 is considered to be positive camber.

Traditionally, camber setting changes are made through manual adjustments of suspension components (e.g., double wishbone suspension components) to change the suspension geometry to achieve a desired camber angle. However, active camber systems can use actuators on telescopic arms of a double wishbone suspension to dynamically change wheel camber 105 as the vehicle 103 drives. In other words, the latest vehicles 103 can now execute camber adjustments on the move, responsive to current driving conditions. It is noted that the type of active camber system described above is provided by way of illustration and not as a limitation. Accordingly, it is contemplated that any type of active camber system known in the art can be used according to the embodiments described herein.

Currently, these active camber systems can be expensive and are generally limited to high performance sports cars or luxury vehicles. At the same time, many high-performance vehicles use semi-slick tires on their high-end sports cars, especially on a race track. Some sports cars are equipped with such tires by default. Such specialty tires are considerably more expensive than regular tires fitted to other vehicles.

To increase grip and cornering speeds, adjustments to the vehicle's suspension characteristics can be made through active camber systems. However, some of these settings, in particular camber settings, have a noticeable effect on tire degradation. For example, negative camber can provide for better grip in corners but can cause increased tire wear on straight road segments. A technical solution for changing the suspension characteristics based on road conditions while also preserving the tires is sought.

To address these challenges, the system 100 of FIG. 1 introduces a capability to provide location-aware camber settings. In one embodiment, connected vehicles 103 equipped with tire temperature sensors can provide readings on current temperatures on the tires, providing an insight on the current strain on the tire. For example, the vehicle 103 can be equipped with a mobile terminal 111 (or other equivalent communication device) to transmit the readings and related data to a mapping platform 113 over a communication network 115. In addition to the tire temperature readings, data on wheel camber 105 (e.g., reported in degrees) and on the location of the vehicle 103 corresponding to the tire temperature reading can be reported.

Figure 2B:
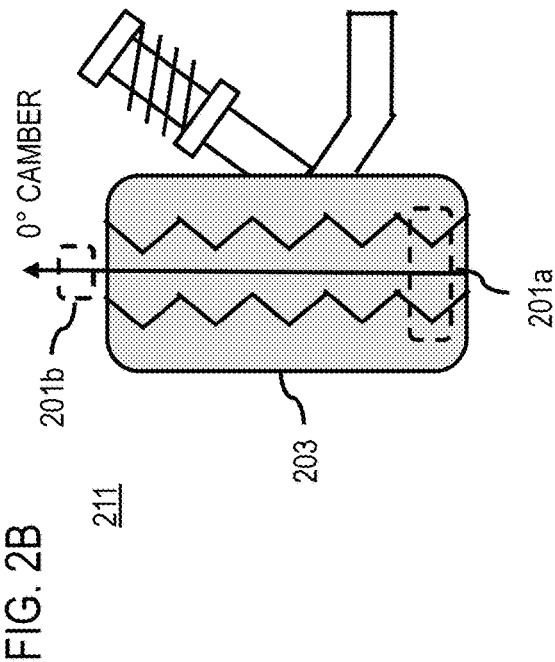
FIGS. 2A-2F are diagrams illustrating examples of the effects of camber settings and other tire conditions on tire temperature, according to one embodiment.
Figure 2D:
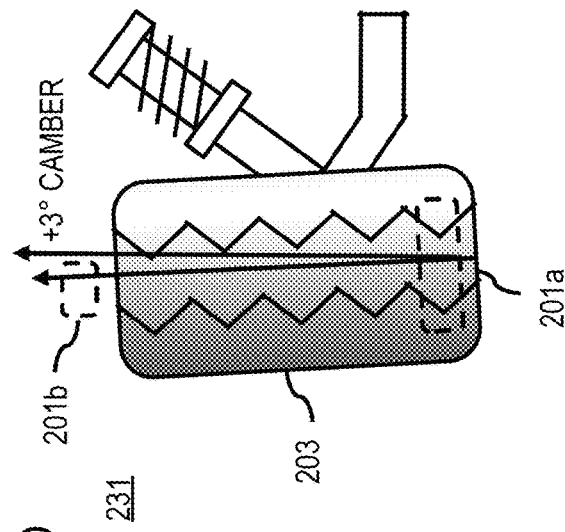
Figure 2A:
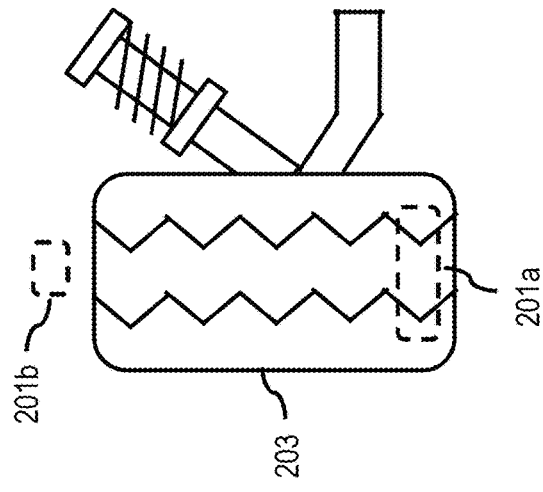

In one embodiment, as shown in FIG. 2A, tire temperature data can be collected using a tire temperature sensor 201. The tire temperature sensor 201 can be implemented in different ways. For example, one option (as shown) would be to include the temperature sensor 201a inside the (wheel) rim to monitor the temperature of a tire 203 and send the collected tire temperature data to the car in a wireless way (e.g., using existing solutions like Bluetooth low energy). Another possible solution (also shown) would be using a temperature sensor 201b based on an infrared thermometer mounted in the wheel arches of the vehicle. For example, the temperature sensor 201b can be one or more infrared sensors pointed to different areas of the tire to monitor the temperature of the corresponding tire area. It is noted that these examples of tire temperatures sensors 201a and 201b (also collectively referred to as tire temperature sensors 201) are provided by way of illustration and not as limitations, and that it is contemplated that any type of tire temperature sensor known in the art can be used according to the embodiments described herein.

In one embodiment, the tire temperature sensors 201 can be used to determine a distribution of temperature across the tire 203. To determine this temperature distribution, the width of the tire 203 can be divided into any number of different zones with individual temperature readings provided for each zone. For example, the tire 203 can be divided into three zones based on the zone's proximity to the centerline of the vehicle 103: an "IN" zone corresponding to the third of the tire 203 that is closest to the centerline of the vehicle 103, a "MID" zone corresponding to the middle third of the tire 203, and an "OUT" zone corresponding to the third of the tire 203 that is farthest from the centerline of the vehicle 103. With three zones, the tire temperature reading would then be: <IN temperature, MID temperature, OUT temperature>. More or fewer zones can be added depending on the granularity of the tire distribution that is desired.

As shown in example 211 of FIG. 2B, the correct or ideal temperature distribution to preserve tires by reducing uneven wear that can shorten tire life is an even temperature distribution across the width of the tire. In this example, the vehicle 103 is operating on a straight and flat road with 0° of camber (i.e., tire is orthogonal to the surface of the road). This configuration causes the tire 203 to contact the road surface evenly across it's the tire width so that frictional heat/tire strain and thus tire temperature remains even. Even refers to the tire temperature differences between the zone readings falling within a similarity threshold. This is illustrated in FIG. 2B as an even color shade across the tire with the shade corresponding to relative tire temperature (e.g., darker shade indicates higher temperature).

Figure 2C:
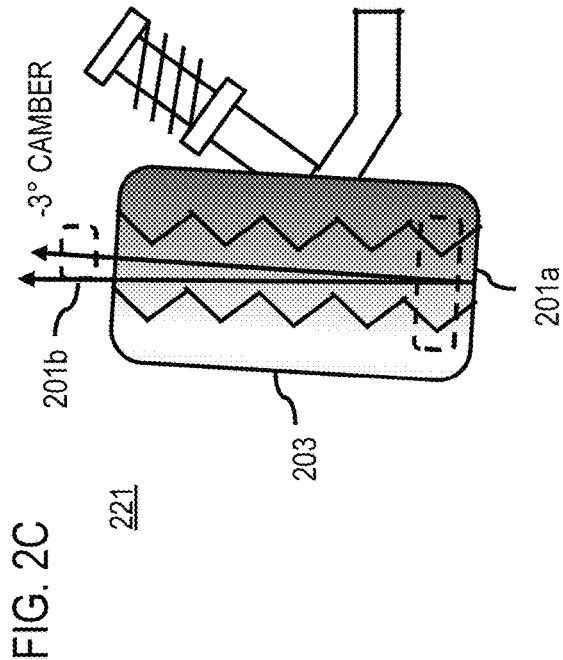

FIGS. 2C and 2D illustrate the effects of different wheel cambers on tire temperature distribution. In the example 221 of FIG. 2C, the road conditions are the same for the vehicle 103 but the wheel camber is now −3° which means that the tire 203 is tilted towards the centerline of the vehicle 103 so that the inner portion of the tire 203 contacts the road surface with more strain than the outer portion of the tire 203 resulting in an uneven tire temperature distribution with the inner portion being at a relatively higher temperature than the outer portion. Therefore, in general, operating with negative camber on a straight and flat roadway can cause the inner portion to wear more quickly, thereby reducing tire life. The example 231 of FIG. 2D illustrates the opposite scenario where the wheel camber is +3°. In this case, when operating on a straight and flat road segment, the outer portion of the tire 203 contacts the road surface with more strain than the inner portion. This leads to an uneven temperature distribution with the outer portion being at a relatively higher temperature than the inner portion and subject to uneven wear.

Figure 2E:
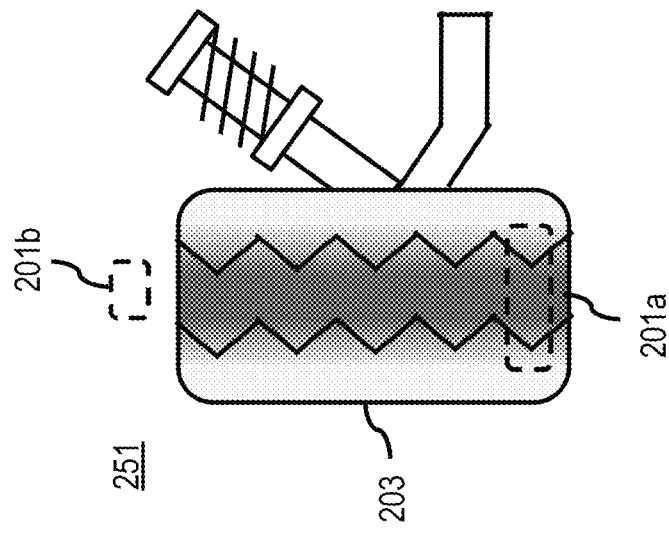
Figure 2F:
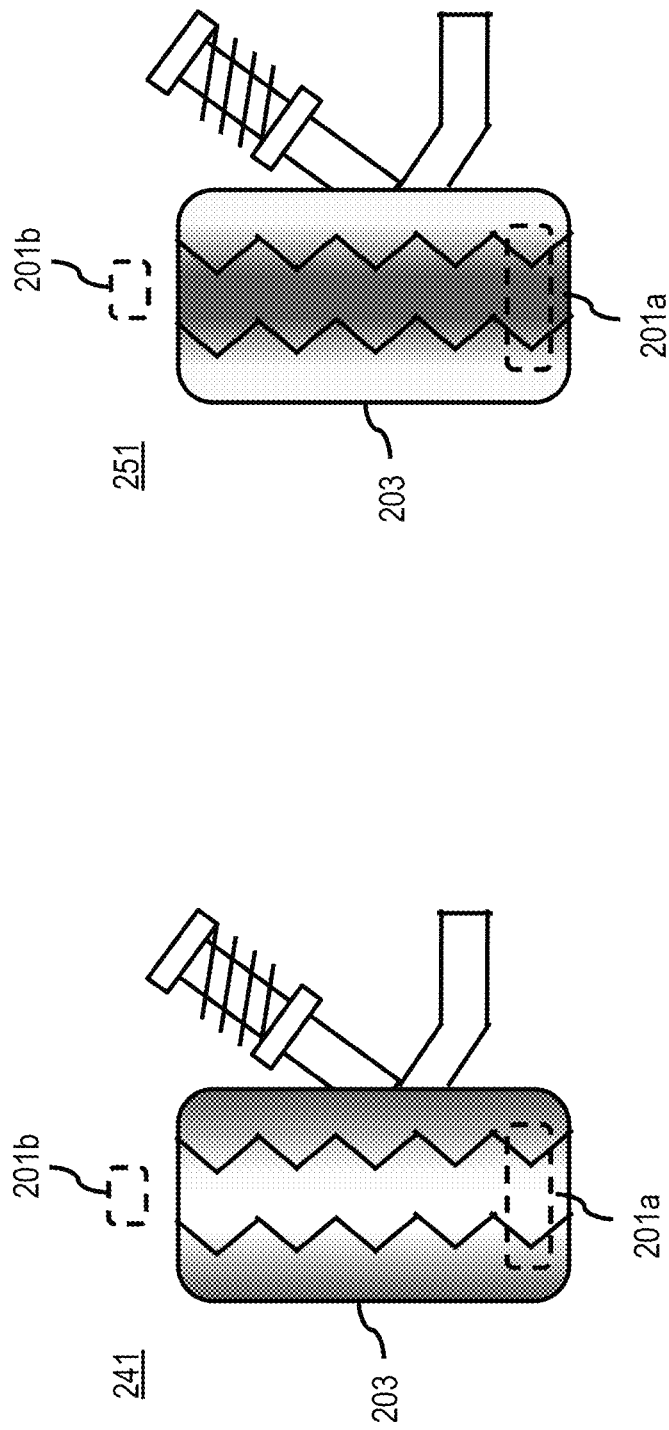

Other factors such as tire inflation can also result in uneven temperature distribution as illustrated in the examples of FIGS. 2E and 2F. In example 241 of FIG. 2E, the tire 203 is underinflated so that much of the load is supported by the tire wall edges, leading to higher temperatures tire wall edges compared to the middle portion of the tire 203 where there is not sufficient internal air pressure to push the tire into better contact with the road surface. As a result, the inner and outer edges of the tire could wear more quickly. In example 251 of FIG. 2F, the tire 203 is overinflated such that the internal air pressure of the tire 203 pushes the middle portion of the tire beyond the contact patches of the inner and outer edges of the tire 203. This also leads to uneven wear of the tire 203.

In one embodiment, the data (e.g., tire temperature data, wheel camber data, location data, and/or data on any other attributes of the vehicle 103, road, environment, etc.) sent by multiple vehicles 103 is kept in a cloud service (e.g., by the mapping platform 113 in an anonymized way) and analyzed to determine suggested or target wheel camber data for specific road links or segments. In one embodiment, the cloud or mapping platform 113 learns from correct and incorrect vehicle configurations reported in the collected data. As used herein, correct and incorrect vehicle configurations refer to whether the collected data indicates that a particular vehicle 103 has a wheel camber 105 that would result in a achieving a target temperature or temperature distribution (e.g., an even temperature distribution to preserver tires) when traveling at a corresponding location or road segment. In this way, the mapping platform 113 can process the collected data to aggregate target wheel camber values as attributes of road link records of the geographic database 117. These stored wheel camber values or settings are referred to as location-aware camber settings because each road segment or link can be individually associated with a wheel camber most suited for that link to achieve a desired temperature distribution and its resulting effect (e.g., preserving tires, maximizing grip, maximizing driving comfort, maximizing vehicle speed, etc.).

In one embodiment, the mapping platform 113 makes the aggregated data (e.g., location-aware wheel camber data in the geographic database 117 or data layer thereof) accessible to other vehicles. For example, as a subsequent vehicle 103 approaches a corner or road segment, the subsequent vehicle 103 can extract the previously stored target camber settings or values and adjust the vehicle 103's own camber settings to drive the corner or road segment. The adjustment can be made with the goal of either maximum grip or with the aim of preserving the tires and/or driving comfort.

In one embodiment, after driving through the corner or road segment, the subsequent vehicle 103 can also upload its data (e.g., tire temperature data, wheel camber data, location data, etc.) to the mapping platform 113 to update or otherwise augment the location-aware wheel camber data. In this way, as more vehicles 103 upload their data, better knowledge on ideal camber settings for the corner or road segment is obtained. In one embodiment, if data is unavailable for one corner or road segment, data from similar corners or road segments (e.g., when comparing their geometry including slope) can be used as a substitute.

In yet another embodiment, vehicles 103 may, but are not required, to perform setting changes for every corner or road segment. To this end, a camber setting may be determined taking in account more than one corner or road segment. For example, a vehicle 103 can query for location-aware camber settings for the next Nupcoming road segments or for road segments within the next specified distance (e.g., segments ahead within the next several kilometers/miles).

In yet another embodiment, the target camber settings can be determined separated for different in goals or use cases. For example, for race tracks, detailed profiles can be obtained as to which are the location-aware camber setting for running a lap in terms of time or in terms of tire durability.

In summary, a cloud service (e.g., the mapping platform 113) that has access to all this information (e.g., real sensor data and measurements of tire temperatures, camber settings, locations, vehicle attributes, etc.) of a lot of identical vehicles (or very similar vehicles in terms of vehicle weight, tire type, tire size, drivetrain type (e.g., all-wheel drive, front wheel drive, rear wheel drive, etc.), vehicle layout (e.g., front, rear, mid mounted engine), any combination thereof, etc.) can use the fundamental technical coherences to make clever suggestions based facts. These vehicles can include but are not limited to cars, trucks, and/or any other vehicle 103 with at least three wheels. By providing for location-aware camber settings that can be used by vehicles 103 equipped with dynamic camber control systems 101 that can make camber adjustments on the move, the system 100 allows the vehicle 103 and driver to use the full potential of the vehicle 103's tires in every situation to increase vehicle grip or cornering performance without losing comfort or sacrificing tire life.

Figure 3:
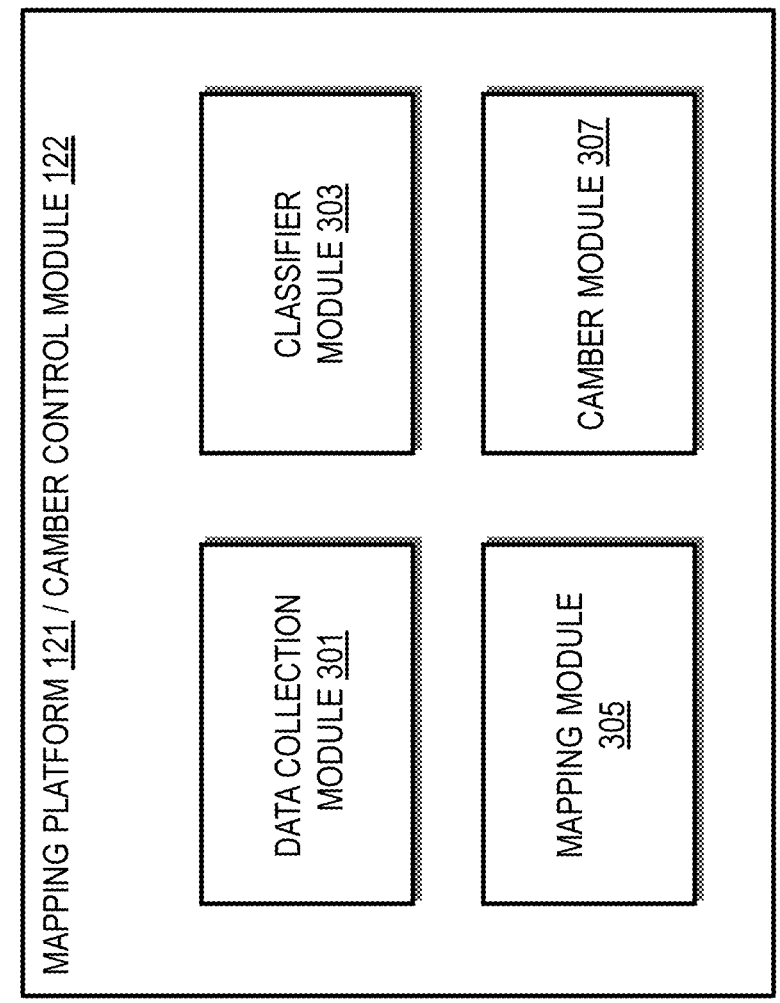
FIG. 3 is a diagram of the components of a mapping platform and/or camber control module, according to one embodiment.

In one embodiment, as shown in FIG. 3, the mapping platform 113 and/or camber control system 101 of the system 100 includes one or more components for providing location-aware camber settings according to the various embodiments described herein. In one embodiment, the mapping platform 113 is a cloud-based or server-side component that can be used to provide location-based camber settings, and the camber control system 101 is a local component of the vehicle 103 that can be used to provide location-aware camber settings alone or in combination with the mapping platform 113. It is contemplated that the functions of these components may be combined or performed by other components of equivalent functionality. As shown, in one embodiment, the mapping platform 113 includes a data collection module 301, classifier module 303, mapping module 305, and camber module 307. The above presented modules and components of the mapping platform 113/camber control system 101 can be implemented in hardware, firmware, software, or a combination thereof. Though depicted as separate entities in FIG. 1, it is contemplated that the mapping platform 113/camber control system 101 may be implemented as a module of any of the components of the system 100 (e.g., a component of the vehicle 103, services platform 119, services 121a-121m, etc.). In another embodiment, one or more of the modules 301-307 may be implemented as a cloud-based service, local service, native application, or combination thereof. The functions of the mapping platform 113 and modules 301-307 are discussed with respect to FIGS. 4-8 below.

Figure 4:
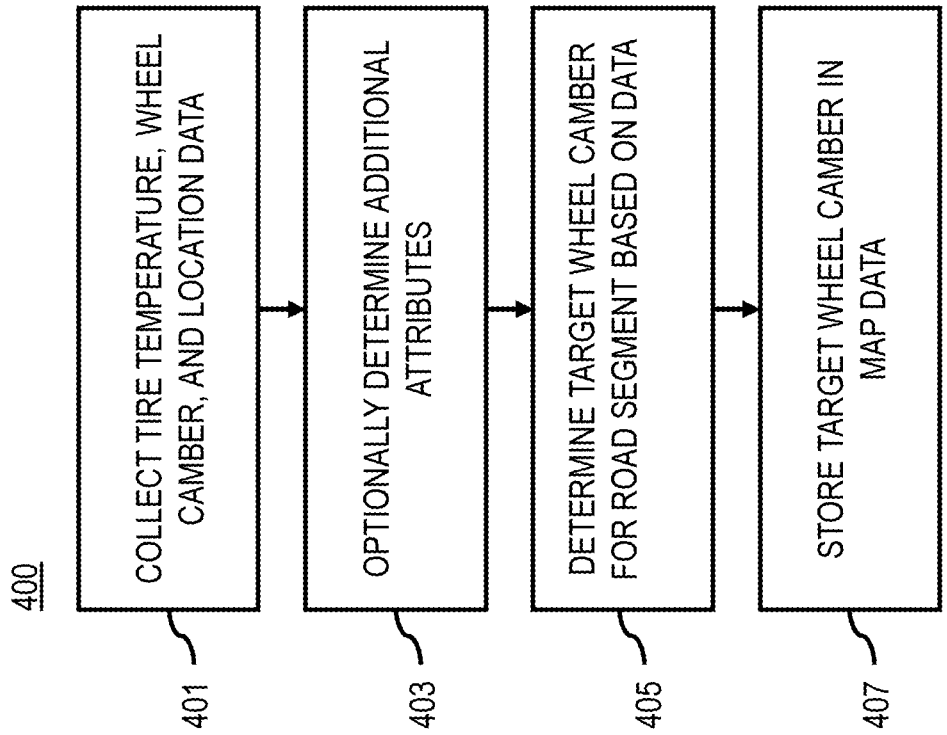
FIG. 4 is a flowchart of a process for generating location-aware camber settings, according to one embodiment.
Figure 11:
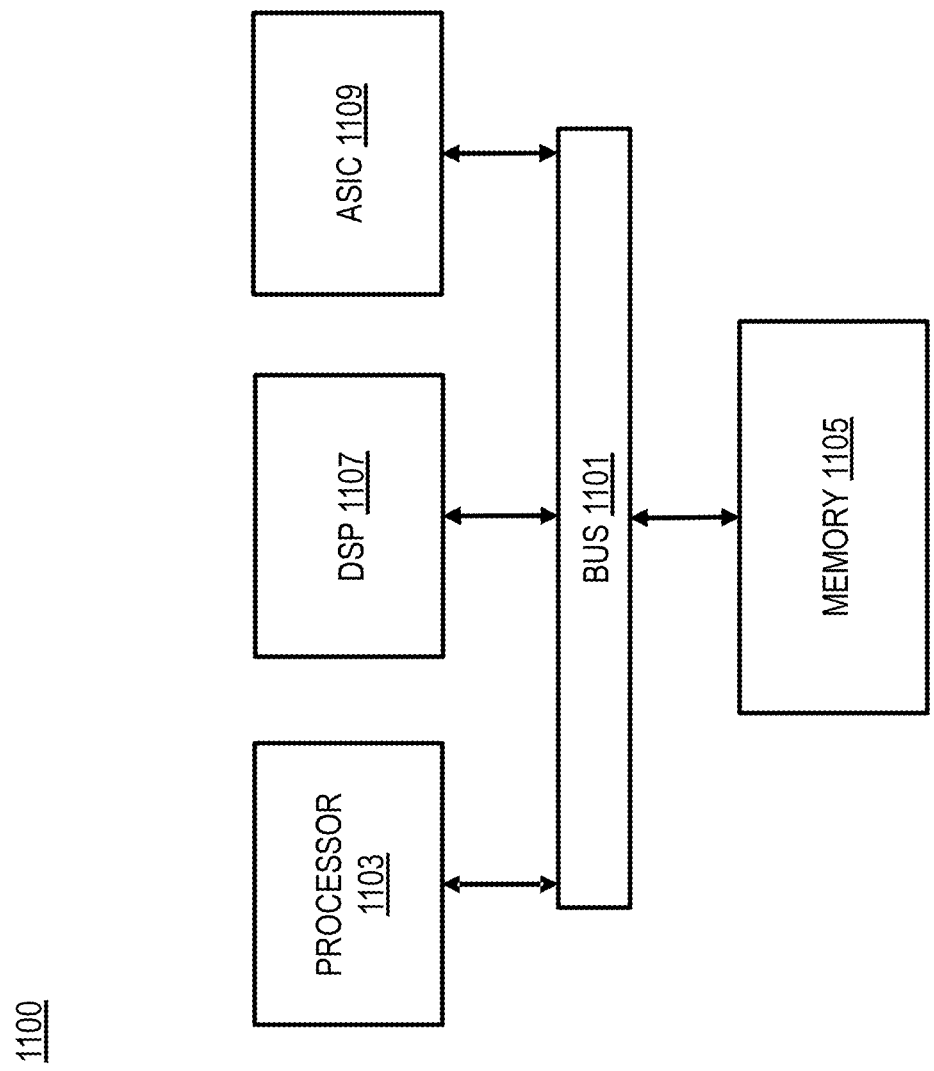
FIG. 11 is a diagram of a chip set that can be used to implement an embodiment of the invention.

FIG. 4 is a flowchart of a process for combining discontinuous road closures detected in a road network, according to one embodiment. In various embodiments, the mapping platform 113/camber control system 101 and/or any of the modules 301-307 may perform one or more portions of the process 400 and may be implemented in, for instance, a chip set including a processor and a memory as shown in FIG. 11. As such, the mapping platform 113/camber control system 101 and/or any of the modules 301-307 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

In step 401, the data collection module 301 collects at least tire temperature data, wheel camber data, and location data from one or more sensors of a plurality of vehicles. In one embodiment, the one or more sensors include a tire temperature sensor configured to sense temperature across multiple zones of the tire width. For example, the zones can include but are not limited to an inside tire temperature, a middle tire temperature, an outside tire temperature, or a combination thereof. The tire temperature against which location-aware or target wheel cambers will be determined can then be based on evaluation there is an even temperature or temperature distribution between the zones (e.g., inside tire temperature, the middle tire temperature, the outside tire temperature, or a combination thereof) to within a threshold temperature difference.

In step 403, the data collection module 301 can optionally determine one or more attributes associated with the plurality of vehicles, the road, and/or environment. In one embodiment, the wheel camber can be generated or stored for a corresponding road segment respect to the one or more attributes. The attributes include but are not limited to: a vehicle identifier, a vehicle weight, an air temperature, a tire pressure, tire dimensions, a tire type, a tire brand, an environmental parameter, or a combination thereof. In other words, the data collection module 301 can determine a location-aware camber setting for different attributes of the vehicle (e.g., vehicle weight, vehicle size, suspension type, front-wheel drive/rear-wheel drive/four-wheel drive, etc.), the tire (e.g., tire type, type dimensions or size, tire brand, etc.), the environment (e.g., weather, time of day, precipitation, etc.), and/or any other contextual parameter. For example, one location-aware camber setting for a corner or road segment can be created for a 3,000 lb vehicle, and another location-aware camber setting for the same corner or road segment can be created for a 5,000 lb vehicle.

In one embodiment, multiple vehicles 103 can be configured to collect the core data (e.g., tire temperature, camber, and location) along with any optional additional attributes to generate location-aware camber settings. The data collecting vehicles 103, for instance, can send reports as they travel along each road segment. In one embodiment, the vehicles 103 can generate data collection reports only for specific types of road segments (e.g., corners, ramps, intersections, etc.) where a change in camber is expected or observed. In yet another embodiment, the collecting of the data (e.g., tire temperature data, the wheel camber data, the location data, and/or optional attributes) can be initiated based on detecting that the vehicles 103 is driving aggressively (e.g., is traveling above a speed threshold, above a cornering force threshold, or a combination thereof). The data can be transmitted from the vehicle 103 using, for instance, a sensor data payload message (e.g., a Sensor Data Ingestion Protocol message or equivalent). In one embodiment, the data payload message can include but is not limited to any combination of the following:

Location (Latitude, Longitude, and optionally Altitude—map matchable)
—or—
Path (Latitude, Longitude, Timestamp) and PathEvents (Event, Time stamp—that can be map-matched to a specific location on the path using the time stamps)
Vehicle ID (or other identifier that allows for vehicle type identification)
Vehicle Weight (optional, an approximation based on vehicle type should be sufficient)
Tire-Temperature (in ° C.):
  Front/Right (IN MID OUT)
  Front/Left (IN MID OUT)
  Rear/Right (IN MID OUT)
  Rear/Left (IN MID OUT)
Current Camber Setting (in Deg)
  Front
  Rear
    —or—
  Front/Right
  Front/Left
  Rear/Right
  Rear/Left
Air-Temperature (in ° C.):
Tire-Pressure (in psi or bar):
  Front/Right
  Front/Left
  Rear/Right
  Rear/Left
Tire-Dimensions (e.g., 265/35 R19)
  Front
  Rear
Tire-Type (Winter/Summer/Semi Slick)
Tire-Brand (e.g., integer for each brand)
Rain Sensor (e.g., integer for water on windshield in percent)

As discussed above, Tire-Temperature can be collected in different ways. One option would be to include a temperature sensor inside the (wheel) rim and send data to the car in a wireless way (e.g., using existing solutions like Bluetooth Low Energy). Another possible solution would be using sensors based on infrared thermometer mounted in the wheel well.

For collecting the Tire-Pressure, the vehicle 103 can use any existing solution known in the art including but not limited to tire pressure monitoring systems (TPMS). Such active tire pressure monitoring system typically use a pressure sensor mounted in the outlet.

Position data can be obtained from on-board location sensors such as not limited to GPS. In one embodiment, the vehicle 103 can report location data as raw location data (e.g., <longitude, latitude, altitude>) or location data map-matched to a specific road link or segment. If the location data is reported as raw data, the data collection module 301 can map match the raw location data to specific road links or segments represented in the geographic database 117 or equivalent.

Current camber settings and motion control damper settings can be obtained from electronically adjustable cambers and electronically adjustable bumpers for vehicles 103 equipped with active camber systems. If the data collection vehicle 103 does not have an active system but its camber is known (e.g., known from manual configuration), the fixed camber value can be reported with the data payload.

In addition, there are existing temperature sensors that measure current air pressure outside of the vehicle already built into most vehicles.

In step 405, the classifier module 303 can process the data collected from the vehicles 103 to determine how much camber should be run on specific corners or road segments. The determination of a target camber comes down to a complicated mix of factors such as but not limited to:
 Road conditions or racetrack design;
 Suspension geometry;
 Suspension stiffness;
 Vehicle weight;
 Tire compound (e.g., tire type and tire brand);
 The ambient temperature;
 etc.

As these values differ for each vehicle and tire combination, it is almost impossible to come up with the perfect values without testing many different combinations. Instead of each vehicle driver testing out different combinations on its own (and learning slowly from that), a cloud-based service (e.g., the mapping platform 113) could learn must faster by analyzing data of hundreds to millions of vehicles 103 for any possible road type or road segment and in any possible road and weather conditions.

In one embodiment, the classifier module 303 uses the tire temperature data (e.g., tire temperature distribution data for the INSIDE, MIDDLE, OUTSIDE across a tire width) to determine which possible combination of the many factors, attributes, or features of the vehicle, tire, road, environment, etc. result in an optimized camber setting for a given road segment or driving context on the road segment. The classifier module 303 can compare the different temperature readings for different camber settings (and/or additional attributes) to determine which camber to use as the target or recommended camber setting for a given location or road segment. For example, on a specific corner or road segment a negative camber can result in an even distribution of tire temperature across the tire width (e.g., similar even distribution as illustrated in FIG. 2B for a zero-camber scenario, but while using negative camber). This is because the complex interaction of suspension geometry and road geometry (e.g., a corner or slope) can alter how a tire contacts a road surface under different camber and driving situations. Accordingly, the classifier module 301 can aggregate all of the vehicle reports for a corner or road segment of interest to determine which reports are associated with a tire temperature distribution or a target tire temperature correlated to an expected outcome (e.g., minimizing tire wear, maximizing grip, maximizing driver comfort, maximizing vehicle speed, etc.).

In other words, classifier module 303 processes the tire temperature data, wheel camber data, and location data to determine a target wheel camber for a road segment indicated by the location data. The target wheel camber is determined from one or more observed wheel cambers indicated in the wheel camber data based on identifying the wheel camber that is associated with a target tire temperature or tire temperature indicated in the tire temperature data. As discussed above, the target wheel camber, the target tire temperature, or a combination thereof is associated with minimizing tire wear, maximizing vehicle grip, maximizing driving comfort, maximizing vehicle speed, or a combination thereof. To determine camber settings that would preserve tires, the classifier module 303 can identify the group of camber setting reports that have reported an even distribution of tire temperatures (e.g., temperatures of individual tire zones are within a threshold temperature difference). The target or location-aware setting can then be determined from the camber settings in that group (e.g., average camber, median camber, and/or the like).

In one embodiment, the target wheel camber setting can be determined individually for each wheel of a vehicle, for front wheels versus rear wheels, or for all wheels. Individual camber settings for each wheel can specify, for instance, a respective camber setting for the front right wheel, front left wheel, rear right wheel, and rear left wheel for each road segment or corner of interest.

In one embodiment, the target camber setting can be determined for road segments or corners corresponding to their unit representation in the geographic database 117. In addition or alternatively, the target camber settings can be determined for combined road segments or corners as a whole, or for subsegments of the road link or corners (e.g., every 500 meters, etc.). The length of the subsegments can be determined based on the technical capability of the active camber system to make camber adjustments on the vehicles 103. For example, if the active camber system can make camber adjustments every 100 meters, 50 meters, etc., the subsegments can be reduced in length accordingly.

In step 407, the mapping module 305 stores the target wheel camber as an attribute of map data (e.g., the geographic database 117) associated with the road segment. In one embodiment, location-aware camber settings can be generated for only those road segments where different camber settings are expected such as a corners, intersections, ramps, and/or other road segments where a vehicle is expected to make other than straight steering wheel inputs or that has a slope. Then the mapping module 305 can specify a default camber value (e.g., 0° camber) for all other road segments (e.g., on the straight or non-sloped segments). In other words, the target wheel camber or location-aware camber is generated or stored based on determining that the road segment is a cornering segment.

In one embodiment, if the mapping module 305 determines that that there is not enough data to generate a location-aware camber setting for a given road segment, the mapping module 305 use a camber value generated from another similar road segment. For example, the mapping module 305 can determine another road segment that has a geometric similarity to the road segment within a threshold similarity. Geometric similarity can be determined based on the road segments having similar curvatures, slopes, attributes (e.g., functional class, surface type, lane width, etc.), and/or the like. The mapping module 305 can then store the target or location-aware wheel camber from the similar road segment as an attribute of the road segment of interest.

Figure 5:
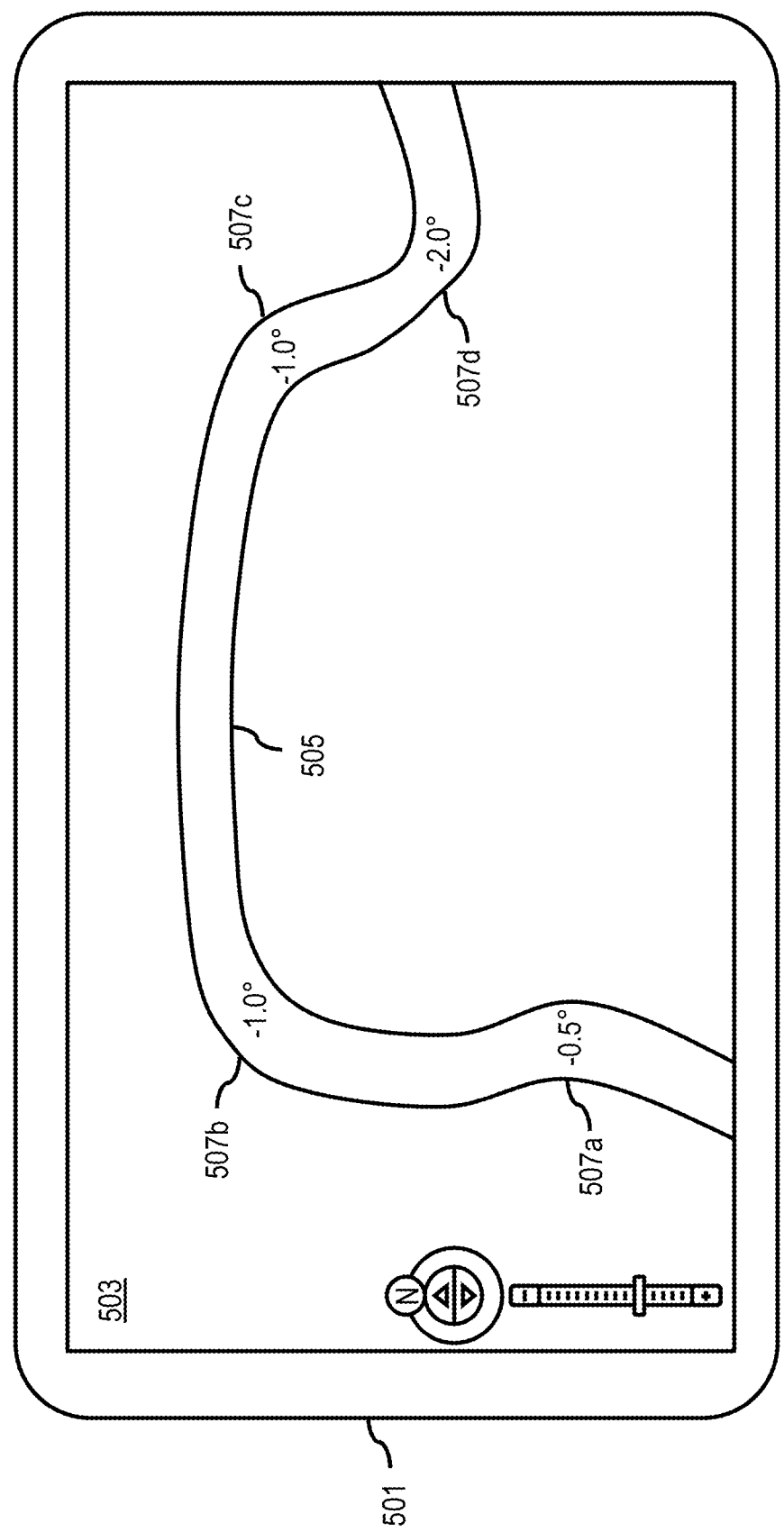
FIG. 5 is a diagram of a user interface for displaying map data including location-aware camber settings, according to one embodiment.

FIG. 5 is a diagram of a user interface for displaying map data including location-aware camber settings, according to one embodiment. In the example of FIG. 5, a device 501 displays a mapping user interface 503 displaying a road 505 with four corners 507a-507d (also collectively referred to as corners 507). The device 501 can query location-aware camber settings for the corners 507 for the geographic database 117, and then display the location-aware settings overlaid on each of the corners. The location-aware comber settings were generated using data collected from previous drives on the road 505 and corners 507 according to the various embodiments described herein to preserve tires while also maximizing grip around corners. As shown, the location-aware camber for corners 507a-507d are respectively −0.5°, −1.0°, −1.0°, and −2.0°. Although the user interface 503 displays the location-aware camber settings as numerical values overlaid on the corresponding corners 507a-507d, it is contemplated that any type of representation of the location-aware cambers can be used including but not limited to symbols, color, shading, etc.

In one embodiment, instead of or in addition to displaying the location-aware camber data in a user interface, the mapping module 305 can provide the map data with the stored target wheel camber to a requesting vehicle that is traveling or is predicted to travel the road segment. The stored target wheel camber is used to adjust a wheel camber setting of the requesting vehicle as described with respect to FIG. 6 below.

Figure 6:
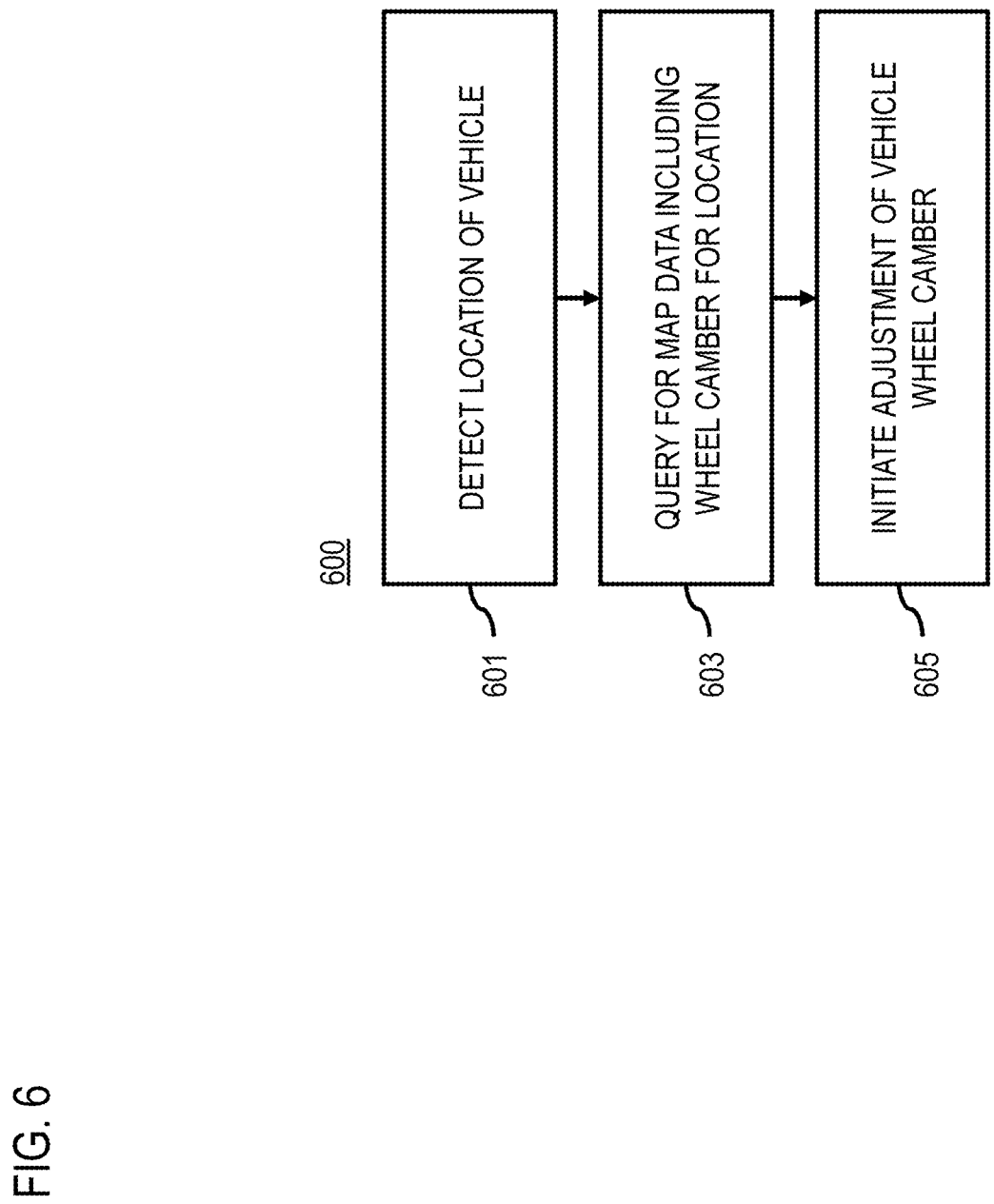
FIG. 6 is a flowchart of a process for using location-aware camber settings to adjust vehicle camber settings, according to one embodiment.

FIG. 6 is a flowchart of a process for using location-aware camber settings to adjust vehicle camber settings, according to one embodiment. In various embodiments, the mapping platform 113/camber control system 101 and/or any of the modules 301-307 may perform one or more portions of the process 400 and may be implemented in, for instance, a chip set including a processor and a memory as shown in FIG. 11. As such, the mapping platform 113/camber control system 101 and/or any of the modules 301-307 can provide means for accomplishing various parts of the process 400, as well as means for accomplishing embodiments of other processes described herein in conjunction with other components of the system 100. Although the process 400 is illustrated and described as a sequence of steps, it is contemplated that various embodiments of the process 400 may be performed in any order or combination and need not include all of the illustrated steps.

In step 601, the camber module 307 detects a location of a vehicle that is traveling or is predicted to travel a road segment. By way of example, the vehicle 103 may be equipped a positioning system (e.g., satellite-based positioning) to determine its location within a road network. As described above, the location can be determined as raw location data (e.g., longitude, latitude, altitude) or be map matched to a road link or segment of a road network.

In step 603, the camber module 307 performs a query for map data for the road segment based on the location of the vehicle. The map data is generated to indicate a target wheel camber for the vehicle according to the embodiments described above. For example, the target wheel camber is determined from one or more observed wheel cambers collected from pervious drives that are associated with a target tire temperature or distribution for the road segment. In one embodiment, the map data can be queried directly from the cloud or server-side component (e.g., the geographic database 117). In addition or alternatively, an instance or copy of the geographic database 117 can be stored locally at the requesting vehicle (e.g., as part of the camber control system 101 or other local component).

In case there is no data available for a certain corner or road segment for which the query is made, the camber module 307 can query for location-aware camber data for similar corners or road segments that are available in the geographic database. Similar, for instance, refers to finding road segments or corner that have a geometry, angle, slope, and/or other specified attributes that are similar to within threshold criteria. In one embodiment, other query criteria can also be used including but not limited to similar weather conditions (e.g., air temperatures, rain), similar visibility (e.g., day vs night), and/or similar vehicles. If there is no data for an identical or similar vehicle available, the camber module 307 can also fallback to data from other vehicles with same tire type, similar sized tires (front, rear), similar vehicle weight, similar vehicle layout, similar vehicle drivetrain, and/or the like.

In one embodiment, as a lot of roads and corners are similar, the mapping platform 113 need only a limited amount of data for each vehicle type and tire combination for certain road segments or corners to make camber suggestions for other similar road segments or corners. In addition, the requesting vehicle need not have tire temperature sensors installed and can rely on pregenerated location-aware camber settings determined from other similar or identical vehicles. In this way, vehicles relying on map data for camber settings can avoid the added expense and/or weight of tire temperature monitoring systems while still benefitting from dynamic camber settings that can preserve tires, etc.

In step 605, the camber module 307 initiates an adjustment of a wheel camber setting of the vehicle based on the target wheel camber to travel the road segment. In one embodiment, initiating an adjustment includes instructing the camber control system 100 of the vehicle 103 to configure the vehicle 103's camber settings 105 to the location-aware camber setting. For example, in an active camber system with telescopic actuators in a double wishbone suspension, the actuators can be activated to achieve the target wheel camber. The camber adjustment can be initiated when the vehicle is within a designated proximity of the road segment or corner corresponding to the location-aware setting. Moreover, the proximity can be based on the adjustment speed of the camber control system 101, the travel speed of the vehicle, and the time or distance to the road segment or corner.

In one embodiment, the vehicle 103 learns based on the location-aware settings determined from the mapping platform 113 which camber settings fit best for certain roads and weather conditions. In other words, the vehicle 103 can monitor and store camber settings for road segments or corners that it has already traveled. This knowledge can be used in cases where there is no internet connection to determine the best camber and suspension settings for an upcoming road segment.

In one embodiment, vehicles may, but are not required, to perform setting changes for every corner. To this end, a camber setting may be determined taking in account more than one corner—for example the next segment ahead with several kilometers/miles. In other words, the camber module 307 determines that the vehicle is predicted to travel at least one additional road segment beyond the road segment. The camber module 307 can then perform another query for additional map data for the at least one additional road segment, wherein the additional map data indicates next target wheel camber for the at least one additional road segment. The camber module 307 can them perform the adjustment of the wheel camber setting as a single adjustment for the road segment and the at least one additional road segment based on the target wheel camber, each next target wheel camber, or a combination thereof.

Figure 7:
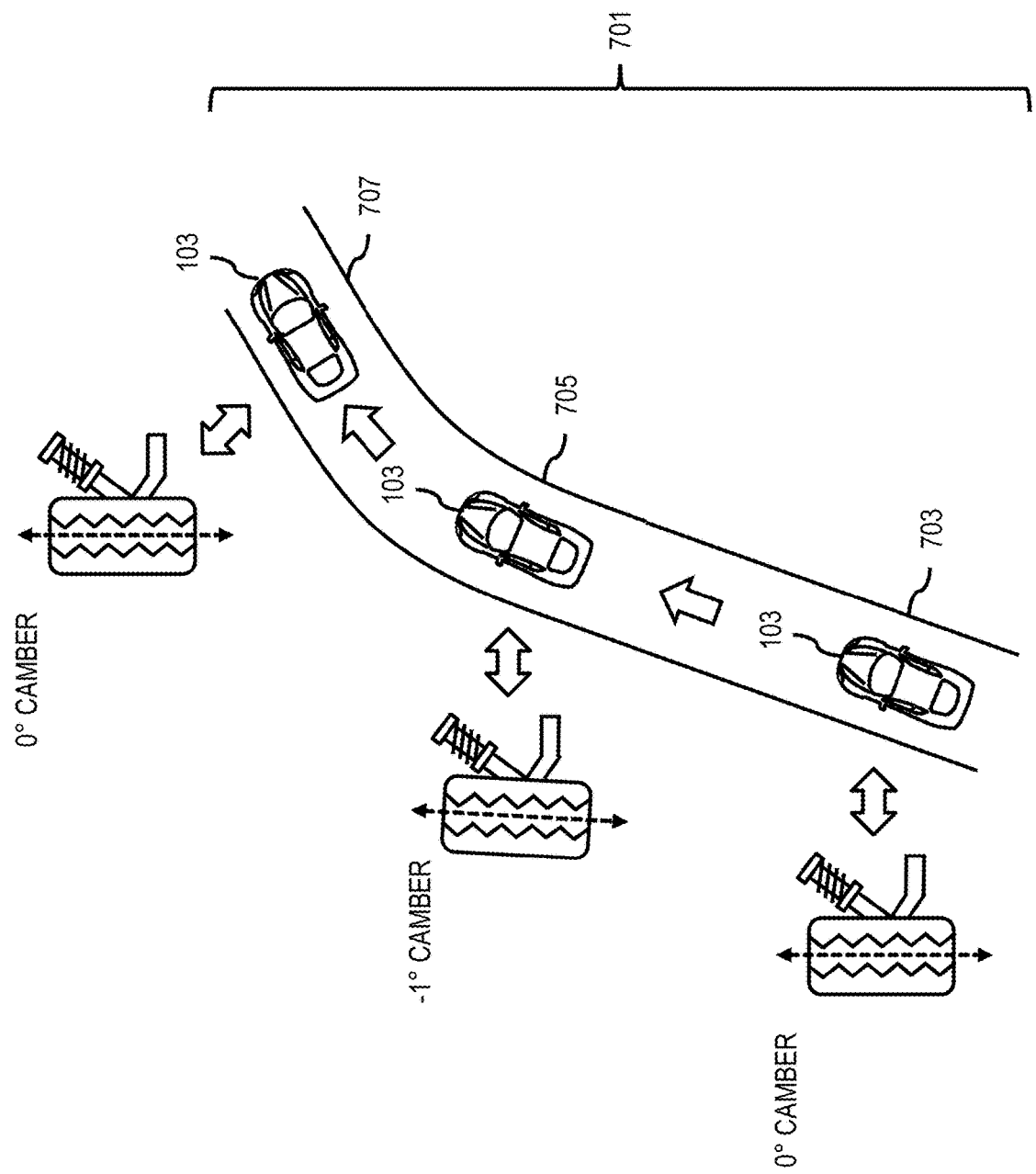
FIG. 7 is a diagram illustrating an example of adjusting a vehicle's camber using location-aware camber settings, according to one embodiment.

FIG. 7 is a diagram illustrating an example of adjusting a vehicle's camber using location-aware camber settings, according to one embodiment. In the example, of FIG. 7, a vehicle 103 is traveling a road 701 that includes a straight segment 703, a corner segment 705, and a straight segment 707. As the vehicle enters the straight segment 703, its camber is set to 0° to maximize contact with road surface for better performance and tire wear. On approaching the corner 705, the vehicle 103 can query the geographic database 117 for the location-aware camber setting for the corner 705. Because of the curve in the corner, data from pervious drives through the corner 705 indicates that for other vehicles similar to the vehicle 103 the best camber setting to maintain an even tire temperature through the corner 705 is −1°. This slight negative camber also provides for increase grip through the corner 705. Accordingly, as the vehicle 103 approaches within a threshold proximity, the vehicle 103 automatically adjusts its camber to the location-aware camber setting for the corner 705 (e.g., −1°). On exiting the corner 705, the vehicle can query for the location-aware camber setting (e.g., 0°) for the upcoming straight segment 707 and adjusts its camber accordingly. If the vehicle 103 where to continue on the straight segment 707 with a negative, the loading on the tire would case increase inner edge tire wear. Therefore, by readjusting to the no camber for the straight segment 707, the vehicle 103 preserves its tire from uneven wear and potentially shortened tire life.

Figure 8:
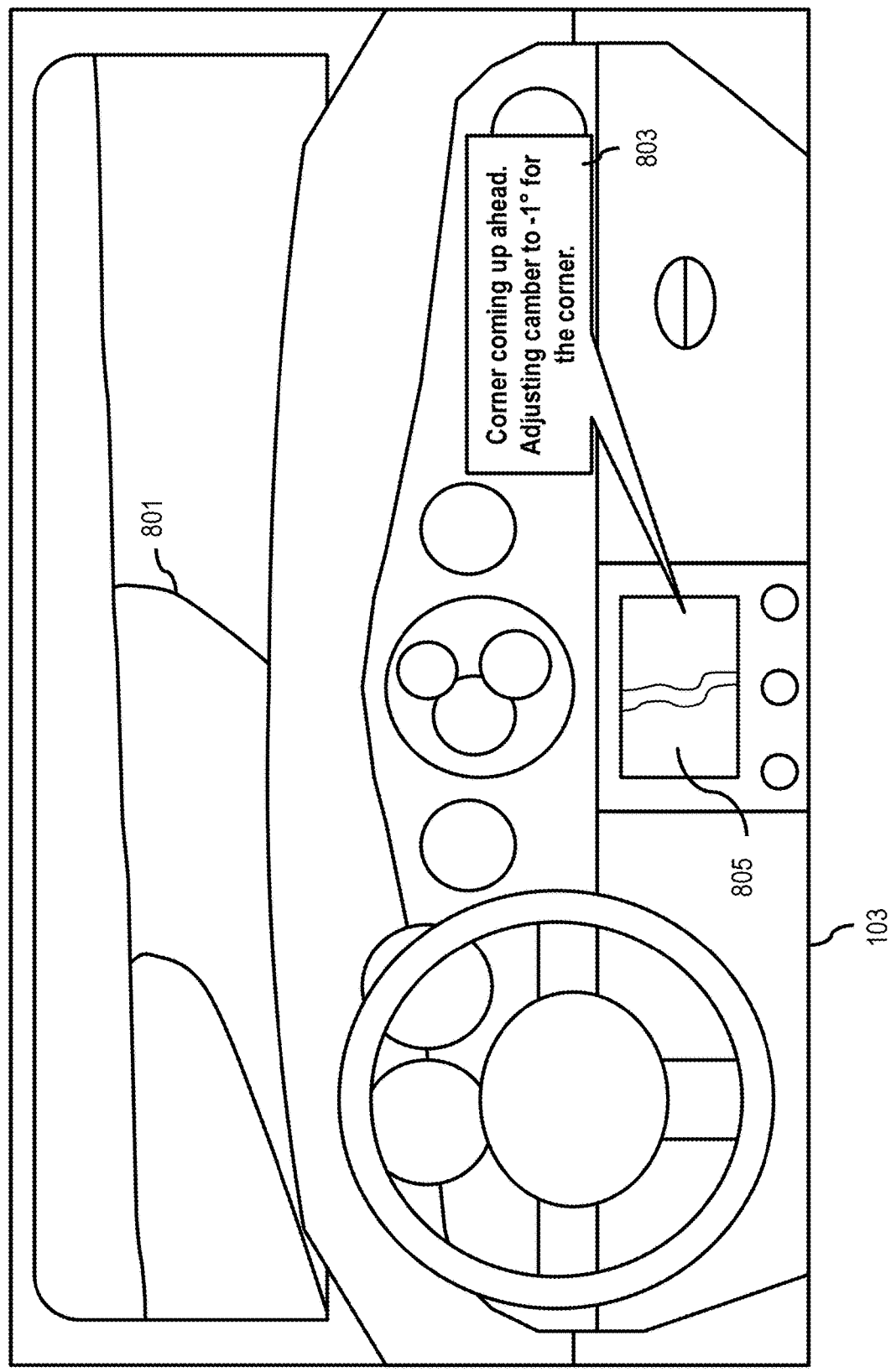
FIG. 8 is a diagram illustrating an example user interface for using location-aware camber settings, according to one embodiment.

In one embodiment, location-aware camber adjustments can be made without informing the driver or passengers of the vehicle 103. In other embodiments, the vehicle 103 can notify the driver or passengers of the camber adjustments as the occur. FIG. 8 is a diagram illustrating an example user interface for using location-aware camber settings, according to one embodiment. In the example of FIG. 8, a vehicle 103 is approaching a corner 801 and queries to the mapping platform 113 to determine a location-aware camber setting for the corner 801. In response, the mapping platform 113 provides map data indicating that the location-aware camber setting for the corner 801 is −1°. The vehicle 103 can then present a notification 803 on an in-vehicle system 805 to indicate: "Corner coming up ahead. Adjusting camber to −1° for the corner."

Returning to FIG. 1, as described above, the system 100 includes vehicles 103 that are equipped with sensors for reporting tire temperature, camber, location, and/or other related attributes. The vehicles 103 are also equipped with active camber control systems 101 that can automatically adjust camber settings on the move. In one embodiment, the vehicles 103 can be manually driven, semi-autonomous, or fully autonomous vehicles. For example, the vehicles 103 are autonomous vehicles or highly assisted driving vehicles that are capable autonomous vehicles and highly assisted driving vehicles are part of a spectrum of vehicle classifications that can span from no automation to fully autonomous operation. For example, the U.S. National Highway Traffic Safety Administration ("NHTSA") in 2017 defines six levels of vehicle automation:

- Level 0 (No-Automation)—"Zero autonomy; the driver performs all driving tasks.";
- Level 1 (Driver Assistance)—"Vehicle is controlled by the driver, but some driving assist features may be included in the vehicle design.";
- Level 2 (Partial Automation)—"Vehicle has combined automated functions, like acceleration and steering, but the driver must remain engaged with the driving task and monitor the environment at all times.";
- Level 3 (Conditional Automation)—"Driver is a necessity, but is not required to monitor the environment. The driver must be ready to take control of the vehicle at all times with notice.";
- Level 4 (High Automation)—"The vehicle is capable of performing all driving functions under certain conditions. The driver may have the option to control the vehicle."; and
- Level 5 (Full Automation)—"The vehicle is capable of performing all driving functions under all conditions. The driver may have the option to control the vehicle."

In one embodiment, the various embodiments described herein are applicable to vehicles 103 that are classified in any of the levels of automation (levels 0-5) discussed above, By way of example, the mobile terminal 111 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that the mobile terminal 111 can support any type of interface to the user (such as "wearable" circuitry, etc.). In one embodiment, the one or more vehicles may have cellular or Wi-Fi connection either through the inbuilt communication equipment or from the mobile terminal 111 associated with the vehicles 103.

In one embodiment, the vehicles 103 can be equipped with various sensors including but not limited to a tire temperature sensor, wheel camber sensor for sensing wheel camber data, a global positioning sensor for gathering location data, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors, and the like. Other sensors may include sensors (e.g., mounted along a perimeter of the vehicle 103) to detect the relative distance of the vehicle from lanes or roadways, the presence of other vehicles, pedestrians, animals, traffic lights, road features (e.g., curves) and any other objects, or a combination thereof. In one scenario, the sensors may also detect weather data, traffic information, or a combination thereof. In one example embodiment, the vehicles may include GPS receivers to obtain geographic coordinates from satellites 125 for determining current location and time. Further, the location can be determined by a triangulation system such as A-GPS, Cell of Origin, or other location extrapolation technologies when cellular or network signals are available. In another example embodiment, the one or more sensors may provide in-vehicle navigation services.

The communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the mapping platform 113 may be a platform with multiple interconnected components. The mapping platform 113 may include multiple servers, intelligent networking devices, computing devices, components and corresponding software for determining safety levels for one or more locations based, at least in part, on signage information. In addition, it is noted that the mapping platform 113 may be a separate entity of the system 100, a part of a services platform 119, one or more services 121a-121m (also collectively referred to as services 121) of the services platform 119, or one or more content providers 123a-123k (also collectively referred to as content providers 123).

In one embodiment, the geographic database 117 stores information on road links (e.g., road length, road breadth, slope information, curvature information, etc.), location-aware camber data for one or more road links, and related data. The location-aware camber data can provide means for dynamically adjusting camber settings as a vehicle travels through a road network. The geographic database 117 may be in a cloud and/or in a vehicle 103 (e.g., cars) and/or a mobile device (e.g., mobile terminal 111).

By way of example, the vehicles 103, the mobile terminals 111, the mapping platform 113, the services platform 121, and the content provider 123 communicate with each other and other components of the communication network 115 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
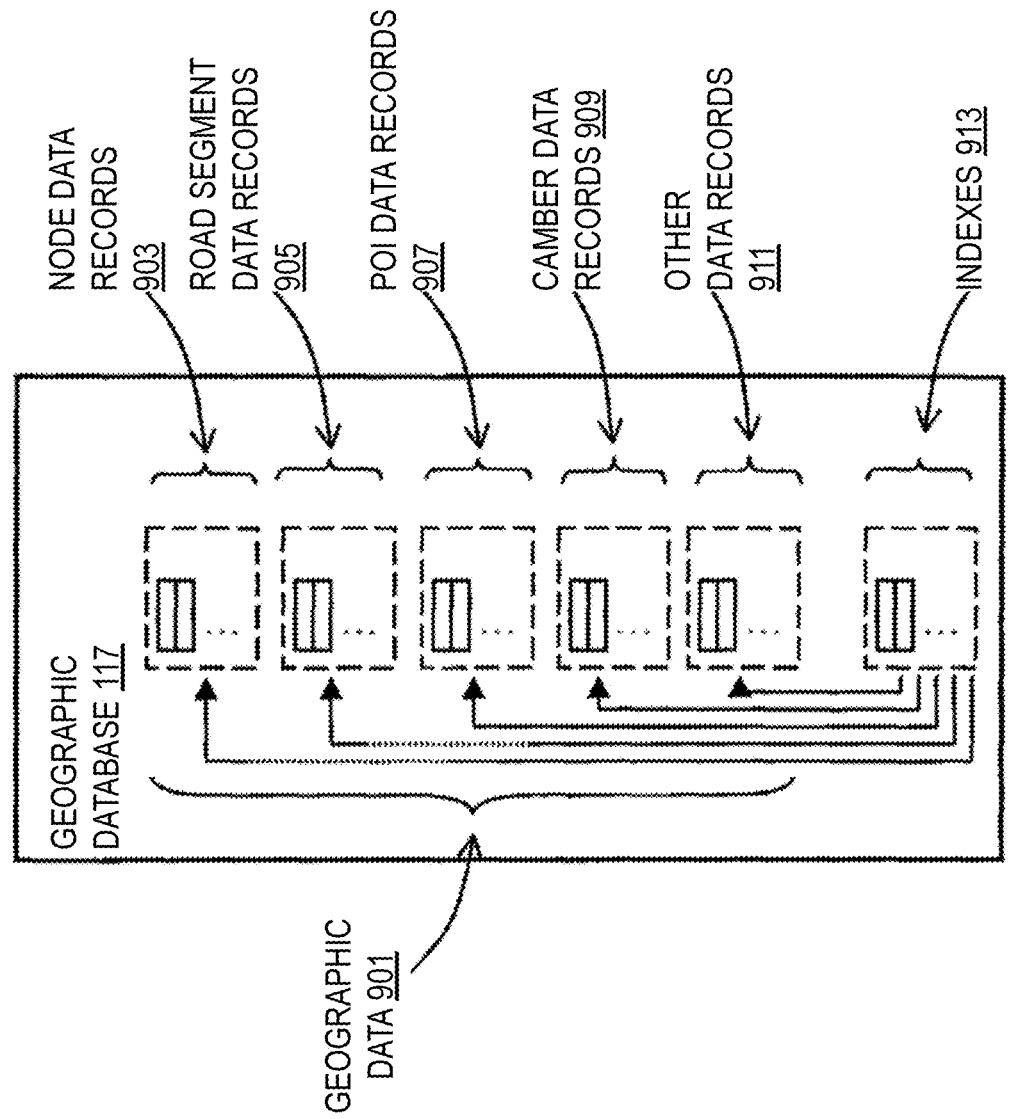
FIG. 9 is a diagram of a geographic database of the system of FIG. 1, according to one embodiment.

FIG. 9 is a diagram of the geographic database 117 of system 100, according to exemplary embodiments. In the exemplary embodiments, detected human accessory data can be stored, associated with, and/or linked to the geographic database 117 or data thereof. In one embodiment, the geographic or map database 117 includes geographic data 901 used for (or configured to be compiled to be used for) mapping and/or navigation-related services, such as for location-based triggering of vehicle sensors as discussed in the various embodiments described herein. The geographic data 901 can also be used for personalized route determination, according to exemplary embodiments. For example, the geographic database 117 includes node data records 903, road segment or link data records 905, POI data records 907, camber data records 909, other data records 911, and indexes 913 for example. More, fewer or different data records can be provided. In one embodiment, the additional data records (not shown) can include cartographic ("carto") data records, routing data, and maneuver data. In one embodiment, the indexes 913 may improve the speed of data retrieval operations in the geographic database 117. The indexes 913 may be used to quickly locate data without having to search every row in the geographic database 117 every time it is accessed.

In exemplary embodiments, the road segment data records 905 are links or segments representing roads, streets, parking areas, or paths, as can be used in the calculated route or recorded route information for determination of one or more personalized routes, according to exemplary embodiments. The node data records 903 are end points corresponding to the respective links or segments of the road segment data records 905. The road link data records 905 and the node data records 903 represent a road network or travel network, such as used by vehicles, cars, and/or other entities. Alternatively, the geographic database 117 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 117 can include data about the POIs and their respective locations in the POI data records 907. The geographic database 117 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 117 also camber data records 909. For example, camber data records 909 may specify a location-aware camber setting for a given road segment or corner, or segment thereof. In addition, the location-aware setting can be specified separately for different vehicle types and/or attributes, weather conditions, time of day, and/or any other attribute specified during data collection.

The geographic database 117 can be maintained by the content provider in association with the services platform 119 (e.g., a map developer). The map developer can collect geographic data to generate and enhance the geographic database 117. There can be different ways used by the map developer to collect data. These ways can include obtaining data from other sources, such as municipalities or respective geographic authorities (e.g., designated parking areas). In addition, the map developer can employ field personnel to travel by vehicle along roads throughout the geographic region to observe features and/or record information about them, for example. Also, remote sensing, such as aerial or satellite photography, can be used. In one embodiment, vehicles 103 operating with the travel network can report human accessory detections to the mapping platform 113 for recording in the geographic database 117.

The geographic database 117 can be a master geographic database stored in a format that facilitates updating, maintenance, and development. For example, the master geographic database 117 or data in the master geographic database 117 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as a navigation system of the vehicle 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 117 can be a master geographic database, but in alternate embodiments, the geographic database 117 can represent a compiled navigation database that can be used in or with end user devices (e.g., vehicles 103, mobile terminals 111) to provided navigation-related functions or location-based functions (e.g., dynamically adjusting wheel camber based on location-aware camber settings). For example, the geographic database 117 can be used with the vehicle 103 to provide an end user with navigation features. In such a case, the geographic database 117 can be downloaded or stored in a navigation system of the vehicle 103, or the vehicle 103 can access the geographic database 117 through a data connection over the communication network 115, for example.

In one embodiment, the end user device can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device can be a cellular telephone. An end user can use the navigation device or system for navigation functions, for example, road link map updates.

The processes described herein for providing location-aware camber settings may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
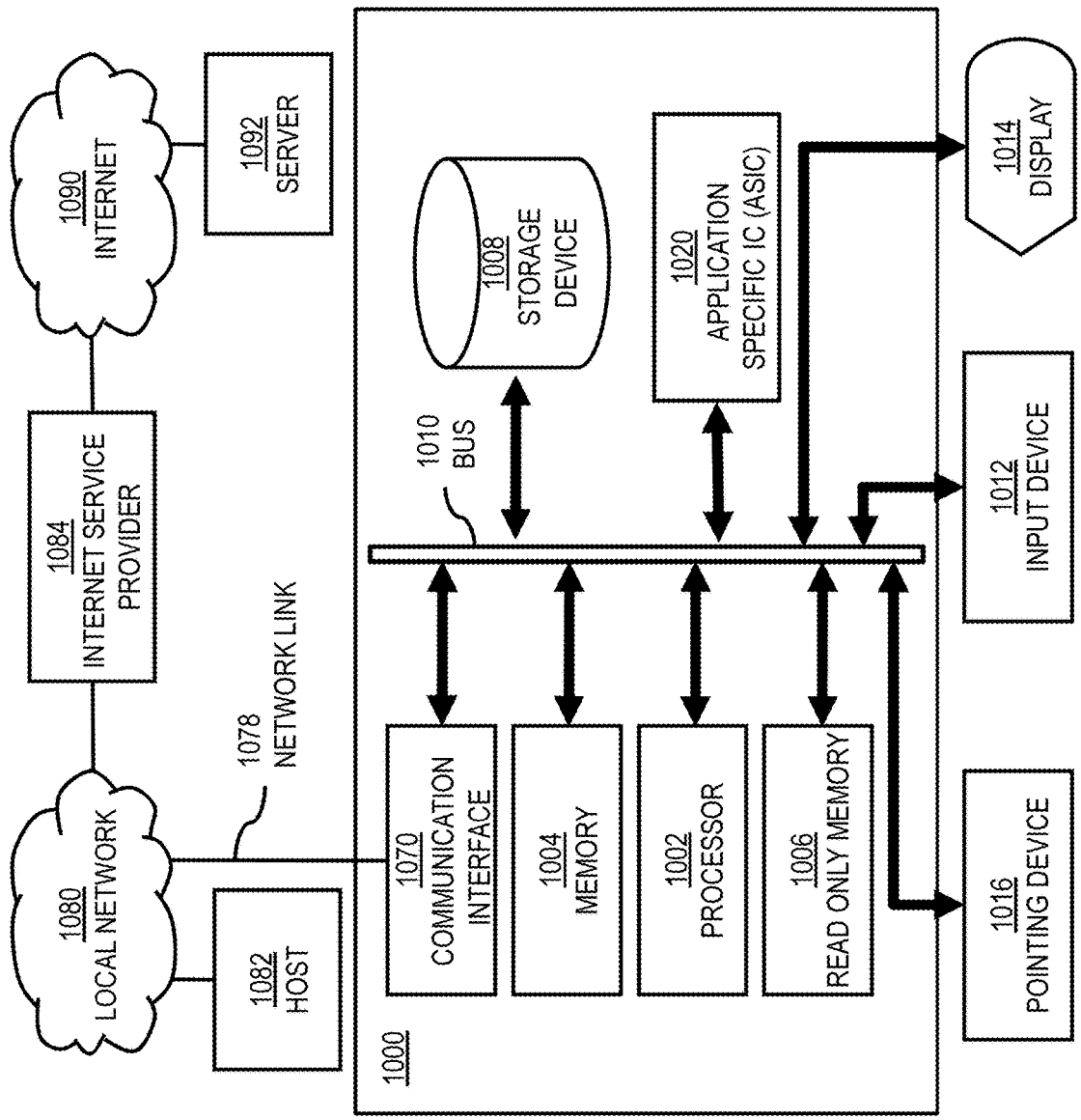
FIG. 10 is a diagram of hardware that can be used to implement an embodiment of the invention.

FIG. 10 illustrates a computer system 1000 upon which an embodiment of the invention may be implemented. Computer system 1000 is programmed (e.g., via computer program code or instructions) to provide location-aware camber settings as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to providing location-aware camber settings. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for providing location-aware camber settings. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing location-aware camber settings, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 115 for providing location-aware camber settings.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004.

Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 11 illustrates a chip set 1100 upon which an embodiment of the invention may be implemented. Chip set 1100 is programmed to provide location-aware camber settings as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide location-aware camber settings. The memory 1105 also stores the data associated with or generated by the execution of the inventive steps.

Figure 12:
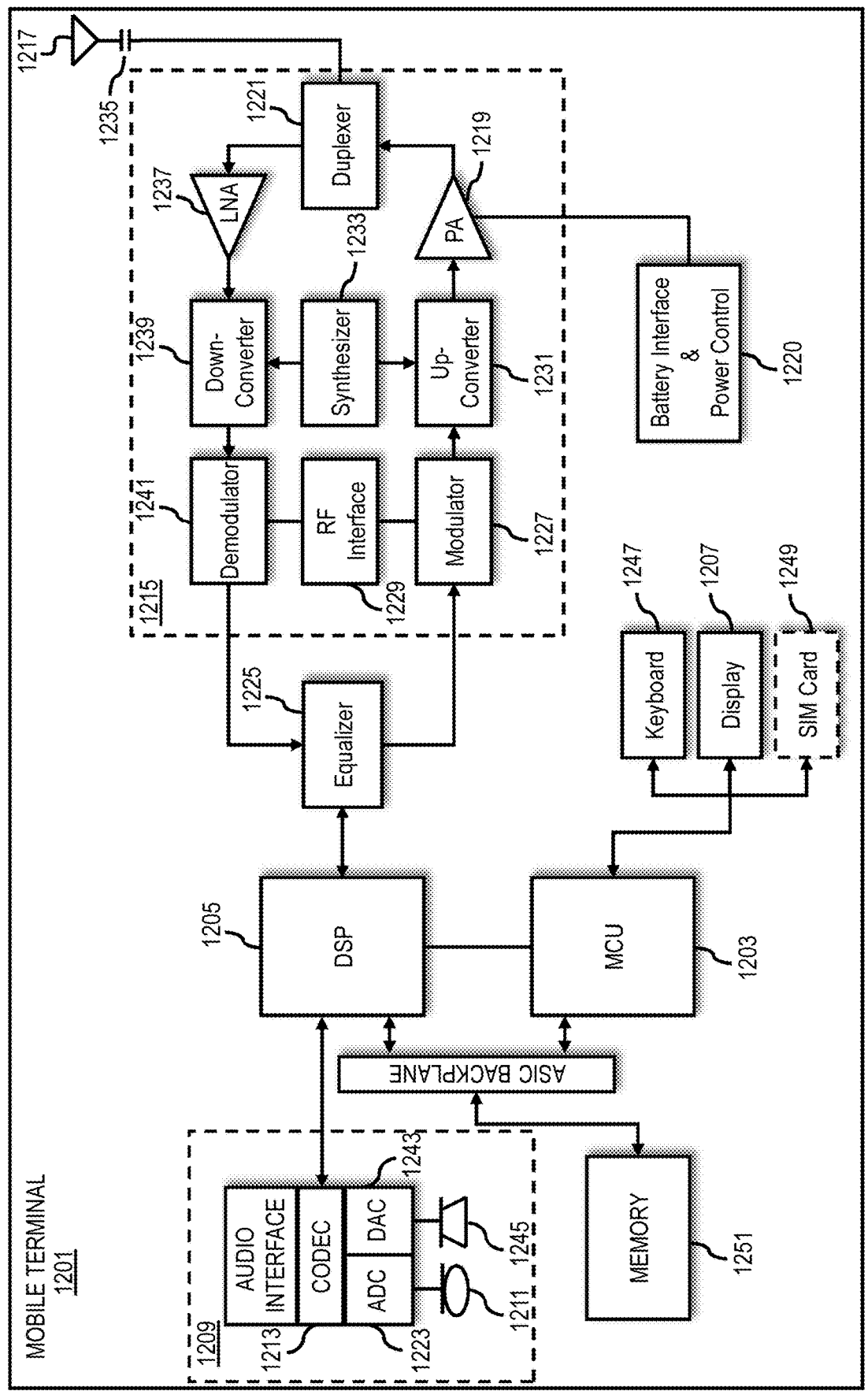
FIG. 12 is a diagram of a mobile terminal (e.g., handset) that can be used to implement an embodiment of the invention.

FIG. 12 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to provide location-aware camber settings. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for providing location-aware wheel camber settings comprising:
    collecting tire temperature data, wheel camber data, and location data from one or more sensors of a plurality of vehicles;
    processing the tire temperature data, the wheel camber data, and the location data to generate a target wheel camber for a road segment indicated by the location data in order to adjust a wheel camber setting of a vehicle, wherein the target wheel camber is determined from one or more observed wheel cambers indicated in the wheel camber data and wherein the target wheel camber is associated with a target tire temperature indicated in the tire temperature data; and
    storing the target wheel camber as an attribute of map data associated with the road segment.

2. The method of claim 1, wherein the target wheel camber, the target tire temperature, or a combination thereof is associated with minimizing tire wear, maximizing vehicle grip, maximizing driving comfort, maximizing vehicle speed, or a combination thereof.

3. The method of claim 1, wherein the one or more sensors include a tire temperature sensor configured to sense an inside tire temperature, a middle tire temperature, an outside tire temperature, or a combination thereof; and wherein the target tire temperature is an even temperature between the inside tire temperature, the middle tire temperature, the outside tire temperature, or a combination thereof within a threshold temperature difference.

4. The method of claim 1, further comprising:
    providing the map data with the stored target wheel camber to a requesting vehicle that is traveling or is predicted to travel the road segment,
    wherein the stored target wheel camber is used to adjust a wheel camber setting of the requesting vehicle.

5. The method of claim 1, further comprising:
    determining one or more attributes associated with the plurality of vehicles,
    wherein the target wheel camber is determined with respect to the one or more attributes.

6. The method of claim 5, wherein the one or more attributes include at least one of: a vehicle identifier, a vehicle weight, an air temperature, a tire pressure, tire dimensions, a tire type, a tire brand, an environmental parameter, or a combination thereof.

7. The method of claim 1, wherein the collecting of the tire temperature data, the wheel camber data, the location data, or a combination thereof is initiated based on detecting that the plurality of vehicles is traveling above a speed threshold, above a cornering force threshold, or a combination thereof.

8. The method of claim 1, wherein the target wheel camber is generated or stored based on determining that the road segment is a cornering segment.

9. The method of claim 1, further comprising:
    determining another road segment that has a geometric similarity to the road segment within a threshold similarity; and
    storing the target wheel camber as an attribute of the another road segment.

10. The method of claim 1, wherein the target wheel camber setting is determined individually for each wheel of a vehicle.

11. An apparatus providing location-aware wheel camber settings comprising:
    at least one processor; and
    at least one memory including computer program code for one or more programs,
    the at least one memory and the computer program code configured to, with the at least one processor, cause the apparatus to perform at least the following,
    detect a location of a vehicle that is traveling or is predicted to travel a road segment;
    perform a query for map data for the road segment based on the location of the vehicle, wherein the map data is generated to indicate a target wheel camber for the vehicle, and wherein the target wheel camber is determined from one or more observed wheel cambers that are associated with a target tire temperature for the road segment; and
    initiate an adjustment of a wheel camber setting of the vehicle based on the target wheel camber to travel the road segment.

12. The apparatus of claim 11, wherein the apparatus is further caused to:
    determine that the vehicle is predicted to travel at least one additional road segment beyond the road segment; and
    perform another query for additional map data for the at least one additional road segment, wherein the additional map data indicates another target wheel camber for the at least one additional road segment,
    wherein the adjustment of the wheel camber setting is performed as a single adjustment for the road segment and the at least one additional road segment based on the target wheel camber, the another target wheel camber, or a combination thereof.

13. The apparatus of claim 11, wherein one or more observed wheel cambers are collected from one or more sensors of a plurality of vehicles that previously traveled the road segment or another road segment that is geometrically similar to the road segment within a threshold similarity.

14. The apparatus of claim 13, wherein the vehicle is not equipped with a tire temperature sensor, and wherein each of the plurality of vehicles is equipped with a tire temperature sensor.

15. The apparatus of claim 11, wherein the adjustment of the vehicle camber setting is performed individually for one or more wheels of the vehicle.

16. A non-transitory computer readable storage medium for providing location-aware wheel camber settings carries one or more sequences of one or more instructions which, when executed by one or more processors, cause, at least in part, an apparatus to perform:

collecting tire temperature data, wheel camber data, and location data from one or more sensors of a plurality of vehicles;

processing the tire temperature data, the wheel camber data, and the location data to generate a target wheel camber for a road segment indicated by the location data in order to adjust a wheel camber setting of a vehicle, wherein the target wheel camber is determined from one or more observed wheel cambers indicated in the wheel camber data and wherein the target wheel camber is associated with a target tire temperature indicated in the tire temperature data; and storing the target wheel camber as an attribute of map data associated with the road segment.

17. The non-transitory computer readable storage medium of claim 16, wherein the target wheel camber, the target tire temperature, or a combination thereof is associated with minimizing tire wear, maximizing vehicle grip, maximizing driving comfort, maximizing vehicle speed, or a combination thereof.

18. The non-transitory computer readable storage medium of claim 16, wherein the one or more sensors include a tire temperature sensor configured to sense an inside tire temperature, a middle tire temperature, an outside tire temperature, or a combination thereof; and wherein the target tire temperature is an even temperature between the inside tire temperature, the middle tire temperature, the outside tire temperature, or a combination thereof within a threshold temperature difference.

19. The non-transitory computer readable storage medium of claim 16, wherein the apparatus is caused to further perform:

providing the map data with the stored target wheel camber to a requesting vehicle that is traveling or is predicted to travel the road segment, wherein the stored target wheel camber is used to adjust a wheel camber setting of the requesting vehicle.

20. The non-transitory computer readable storage medium of claim 16, wherein the apparatus is caused to further perform:

determining one or more attributes associated with the plurality of vehicles, wherein the target wheel camber is determined with respect to the one or more attributes.

\* \* \* \* \*